(12) United States Patent
Kern-Trautmann et al.

(10) Patent No.: US 9,151,391 B2
(45) Date of Patent: Oct. 6, 2015

(54) LABYRINTH SEAL HAVING LABYRINTH RINGS WITH DIFFERENT WEAR RESISTANCES

(71) Applicants: Andreas Kern-Trautmann, Estenfeld (DE); Mathias Seuberling, Großeibstadt (DE)

(72) Inventors: Andreas Kern-Trautmann, Estenfeld (DE); Mathias Seuberling, Großeibstadt (DE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 14/361,095

(22) PCT Filed: Nov. 28, 2012

(86) PCT No.: PCT/EP2012/073845
§ 371 (c)(1),
(2) Date: May 28, 2014

(87) PCT Pub. No.: WO2013/079535
PCT Pub. Date: Jun. 6, 2013

(65) Prior Publication Data
US 2014/0333032 A1 Nov. 13, 2014

(30) Foreign Application Priority Data
Nov. 28, 2011 (DE) .......... 10 2011 087 207

(51) Int. Cl.
*F16J 15/44* (2006.01)
*F16J 15/453* (2006.01)
*B23P 6/00* (2006.01)
*F16C 33/80* (2006.01)

(52) U.S. Cl.
CPC .......... *F16J 15/453* (2013.01); *B23P 6/00* (2013.01); *F16J 15/445* (2013.01); *F16C 33/80* (2013.01); *Y10T 29/49719* (2015.01); *Y10T 29/49826* (2015.01)

(58) Field of Classification Search
CPC .................................. F16J 15/4476
See application file for complete search history.

(56) References Cited

U.S. PATENT DOCUMENTS

| | | | | |
|---|---|---|---|---|
| 2,040,218 A | * | 5/1936 | Soderberg | 277/419 |
| 3,701,536 A | * | 10/1972 | Matthews et al. | 277/415 |
| 6,113,105 A | * | 9/2000 | Johnson | 277/412 |
| 2006/0133928 A1 | | 6/2006 | Bracken et al. | |
| 2006/0228209 A1 | | 10/2006 | Couture | |
| 2009/0200748 A1 | * | 8/2009 | Ochiai et al. | 277/415 |

FOREIGN PATENT DOCUMENTS

| | | | |
|---|---|---|---|
| BE | 405133 | 9/1934 | |
| CN | 101070915 A | 11/2007 | |
| EP | 1712743 | 10/2006 | |
| GB | 651921 | 4/1951 | |
| JP | 04203565 A | * 7/1992 | F16J 15/447 |

OTHER PUBLICATIONS

English translation of International Search Report for parent application No. PCT/EP2012/073845.

* cited by examiner

*Primary Examiner* — Gilbert Lee
(74) *Attorney, Agent, or Firm* — Bryan Peckjian; SKF USA Inc. Patent Dept.

(57) ABSTRACT

A labyrinth seal includes a first labyrinth ring and a second labyrinth ring. In an installed state of the labyrinth seal, the first labyrinth ring and the second labyrinth ring engage in each other in an at least partially overlapping manner and are rotatable relative to each other. Furthermore, in the installed state, mutually-opposing surfaces of the first and of the second labyrinth ring have different wear resistances.

20 Claims, 2 Drawing Sheets

LABYRINTH SEAL HAVING LABYRINTH RINGS WITH DIFFERENT WEAR RESISTANCES

CROSS-REFERENCE

This application is the US national stage of International Patent Application No. PCT/EP2012/073845 filed on Nov. 28, 2012, which claims priority to German Patent Application No. 10 2011 087 207.8 filed on Nov. 28, 2011.

TECHNICAL FIELD

Exemplary embodiments of the present invention relate in general to sealing elements, and in particular to a labyrinth seal and a method for operating such a labyrinth seal.

RELATED ART

It is known to use labyrinth-type sealing elements in order to seal components, which move or rotate relative to one another, with respect to an external environment. A commonly used form of such a seal consists in that a bearing cover, which is flange-mounted on a bearing housing, is provided or the bearing housing is provided with a plurality of annularly-formed ribs, whereby a first labyrinth ring of a labyrinth seal can be formed. For sealing, the first labyrinth ring cooperates with an adjacent toothed second labyrinth ring that can be attached to an axis or a shaft. The toothed ribs of the first and of the second labyrinth ring together form a so-called seal labyrinth.

A labyrinth seal can thus, for example, be used as a contact-free shaft seal. The sealing effect of the labyrinth seal is based on the extension of the sealing path by the arrangement of the toothed, i.e. engaging in each other, ribs of the labyrinth rings, which leads to tortuous and constricted gaps between the rings on the shaft, which rings are rotating relative to each other, and the fixed housing part. Due to a relatively high flow resistance in the long, tortuous or convoluted gap (seal labyrinth) between the two labyrinth rings, only a relatively small, tolerable amount of fluid (leakage mass flow) can escape or enter through the labyrinth seal. Contamination from outside can optionally be prevented by additionally utilized, directed mass flows (e.g. barrier media, such as nitrogen).

High precisions of manufacturing tolerances of the components involved, i.e. the labyrinth rings, are required for a high efficiency of a labyrinth seal. Due to certain operating conditions and/or a too-imprecise manufacturing of the components, unwanted contacts of the shaft- and housing-part of the labyrinth can result during the operation of the labyrinth seal. For example, the two labyrinth rings of the labyrinth seal can contact each other during operation due to external loading influences. As a result, permanent damage of the seal assembly, even up to the formation of sparks—and thus the risk of fire—, can not be excluded.

To avoid such unwanted contacts of the labyrinth rings due to manufacturing tolerances, with larger manufacturing diameters of the seal assemblies e.g. tolerances or clearances can be enlarged. However this leads to the disadvantage that the sealing action and thus also the efficiency of the labyrinth seal assembly decrease.

SUMMARY

It is thus an object of the present teachings to provide an improved labyrinth seal assembly.

According to one aspect of the present teachings, at least parts or sections of the labyrinth rings of a labyrinth seal, which labyrinth rings engage in each other, have different wear resistances. Regions that are less wear-resistant than others serve as intended wear regions of a labyrinth seal assembly. For example, materials having low wear resistance can be incorporated in labyrinth seals, which materials, during unintended contact of the two labyrinth rings (for example due to an external loading influence), result in an intended wear of the material having the lesser wear resistance.

According to some exemplary embodiments of the present invention, at least the worn wear-regions or -parts can be replaced after a predetermined amount of wear. The amount of wear can be determined, for example, based upon a tolerable amount of a leakage mass flow into or out of the labyrinth seal assembly.

According to one aspect of the present invention, a labyrinth seal is provided. The labyrinth seal includes a first labyrinth ring and a second labyrinth ring, wherein in an installed state of the labyrinth seal the first and the second labyrinth ring engage in each other in an at least partially overlapping manner and are rotatable relative to each other. Furthermore, in the installed state, mutually-opposing surfaces of the first and of the second labyrinth ring have different wear resistances. For this purpose, the mutually-opposing surfaces can for example be manufactured from different materials or can be differently surface- and/or heat-treated. "Wear resistance" is understood to mean the resistance of a solid body to wear (mechanical abrasion).

For example, a fixed housing part can be associated with the first labyrinth ring, whereas the second labyrinth ring can be disposed on a rotating shaft. The two labyrinth rings engaging in each other are thus rotatable relative to each other. Depending on the embodiment of the seal assembly, the two labyrinth rings or their annularly-extending ribs can engage in each other in the axial direction, i.e. in the direction of a shaft rotational axis, or in the radial direction, i.e. perpendicular to the shaft rotational axis. In the following, when an axial labyrinth seal assembly is mentioned, ribs that axially engage in each other are meant, while when a radial labyrinth seal assembly is discussed, ribs that radially engage in each other are meant. Furthermore, exemplary embodiments of the present invention can of course also be used in combinations of axial and radial labyrinth seal assemblies.

The different or differing wear resistances of the mutually-opposing surfaces of the first and of the second labyrinth ring can for example be achieved using different material hardnesses of the mutually-opposing surfaces. In other words, this means that the mutually-opposing surfaces of the first and of the second labyrinth ring have different material hardnesses at least in one section thereof. For example, a material of the first labyrinth ring can have a greater material hardness than a material of the second labyrinth ring, so that during operation of the labyrinth seal, i.e. during rotation and/or loading of the shaft, the lesser-wear-resistant material of the second labyrinth ring wears faster during a contacting of the two labyrinth rings than the more wear-resistant material of the first labyrinth ring.

According to some exemplary embodiments, the first labyrinth ring can, e.g. be manufactured completely or partially from (possibly hardened) steel. In such exemplary embodiments the second labyrinth ring can be manufactured completely or partially from a softer material so that, during an unintended contact of the two labyrinth rings during operation of the labyrinth seal, an intentional wear of the second labyrinth ring results. Possible materials which are softer than steel are, e.g., non-ferrous metals or plastics. Expressed with other words, this means that a surface material of the first labyrinth ring can be a (optionally hardened) steel according to some exemplary embodiments, and that a surface material of the second labyrinth ring is a relatively softer material, for example from the group of non-ferrous metals or plastics. Here "non-ferrous metals" represents a collective term for a subgroup of the non-ferrous metals excluding the precious metals. They include metals such as cadmium (Cd), cobalt (Co), copper (Cu), nickel (Ni), lead (Pb), tin (Sn), or zinc (Zn). These base, heavy metals are themselves colored or form colored alloys such as brass, bronze, and gunmetal, wherein the alloys are also counted among the base metals The surface regions provided for wear or optionally a complete, less-wear-resistant labyrinth ring can be incorporated in the labyrinth seal assembly such that they can be replaced after a predetermined amount of wear, wherein the amount of wear can be determined, for example, based upon a tolerable amount of a leakage mass flow (e.g. of lubricant out of the seal labyrinth). According to some exemplary embodiments, the second (less-wear-resistant) labyrinth ring can be formed such that at least one region of the second labyrinth ring, which region is worn after operation of the labyrinth seal, or the complete labyrinth ring, is replaceable or can be replaced. For this purpose the ribs of the two labyrinth rings can each be formed such that, in the assembled state of the labyrinth seal, they do not mutually engage behind each other. This means that the annularly-extending ribs of the two labyrinth rings extend substantially only in one installation direction (e.g. axially or radially). As a result, the two components or labyrinth rings of the labyrinth seal can be pushed in each other or out-of-each-other comparatively easily, without it being made more difficult by segments of the annular ribs that extend perpendicular to the installation direction. However, according to other exemplary embodiments, rearward engaging-flanges and/or undercuts of the two labyrinth rings are possible in a comparatively simple (dis-)assembly of the labyrinth seal assembly if at least one of the labyrinth rings is formed in an appropriately segmented manner, i.e. it is separable from the other part.

According to some exemplary embodiments, the first labyrinth ring can be manufactured completely from a first material (e.g. steel). On the other hand, the second labyrinth ring can also be manufactured completely from a second material (e.g. non-ferrous metal or plastic) having a lesser wear resistance than the first material. Of course, exemplary embodiments are also conceivable wherein the first labyrinth ring has a lesser wear resistance than the second labyrinth ring. Here it is advantageous to assign the lesser wear resistance to the particular labyrinth ring which is more easily accessible after operation of the labyrinth seal, and thus is more easily replaceable. In some seal assemblies this can be a shaft- or bearing-side labyrinth ring. In even further exemplary embodiments, an environment-side or housing-side labyrinth ring can be more easily accessible.

Compared to exemplary embodiments wherein each individual labyrinth ring is manufactured completely from a more-wear-resistant or lower-wear material compared to the other labyrinth ring, the present invention also comprises exemplary embodiments wherein at least one of the two labyrinth rings is manufactured from a surface material and a further material having a different wear resistance compared to the surface material. Here the surface material is located on the surface region facing the respective other labyrinth ring. Expressed in other words, this means that more-wear-resistant or, however, also lower-wear surface regions can be assigned to the two labyrinth rings. According to some exemplary embodiments, an entire surface facing the sealing gap can thus be treated, for example by coating or other surface treatment measures, such as, e.g., hardening. On the other hand, however, only certain surface sections facing the sealing gap, which surface sections are particularly vulnerable to contact, can be hardened or softened (by appropriate surface treatment) compared to the remaining material of the labyrinth ring. Thus the surface material, e.g., in one of the labyrinth rings, can be selected to be softer than the remaining ring material so that, during operation of the labyrinth seal, the surface material wears faster than the remaining material of the particular labyrinth ring.

According to a further aspect of the present invention, a method is provided for operating a labyrinth seal. The method comprises a step of providing a first labyrinth ring and a second labyrinth ring so that, in the installed state of the labyrinth ring, (outer) surfaces of the first and of the second labyrinth ring, which (outer) surfaces have different wear resistances, oppose each other. In a further step the labyrinth seal is installed so that, in the installed state of the labyrinth seal, the first and the second labyrinth ring engage in each other in an at least partially overlapping manner and are rotatable relative to each other.

Using exemplary embodiments of the present invention, labyrinth seals can be designed less sensitive with respect to manufacturing tolerances, since contacts between the two labyrinth rings do not lead to irreversible damage. Labyrinth seals can thus be designed less sensitive with respect to fluctuations of operating conditions, such as, e.g., installation errors, thermal expansions, out-of-roundnesses, deformations due to centrifugal forces, etc. A long-lasting efficiency of a labyrinth seal system can be ensured by a return to an optimal sealing gap (by the exchange of worn parts). Wear and tear caused by contacts or abrasive media can be restored to its original, unworn state by the exchange of worn parts. In addition, by using exemplary embodiments of the present invention, spark formation caused by contact/friction of the two labyrinth rings, which are rotating relative to each other, can be prevented, so that in addition a safeguard against explosions can be ensured in hazardous environments.

Exemplary embodiments of the present invention are explained in more detail below with reference to the accompanying Figures.

DETAILED DESCRIPTION OF THE INVENTION

In the following description of some embodiments of the present invention, which embodiments are merely illustrated in an exemplary manner, like reference numbers indicate like or comparable components.

Figure 1A:
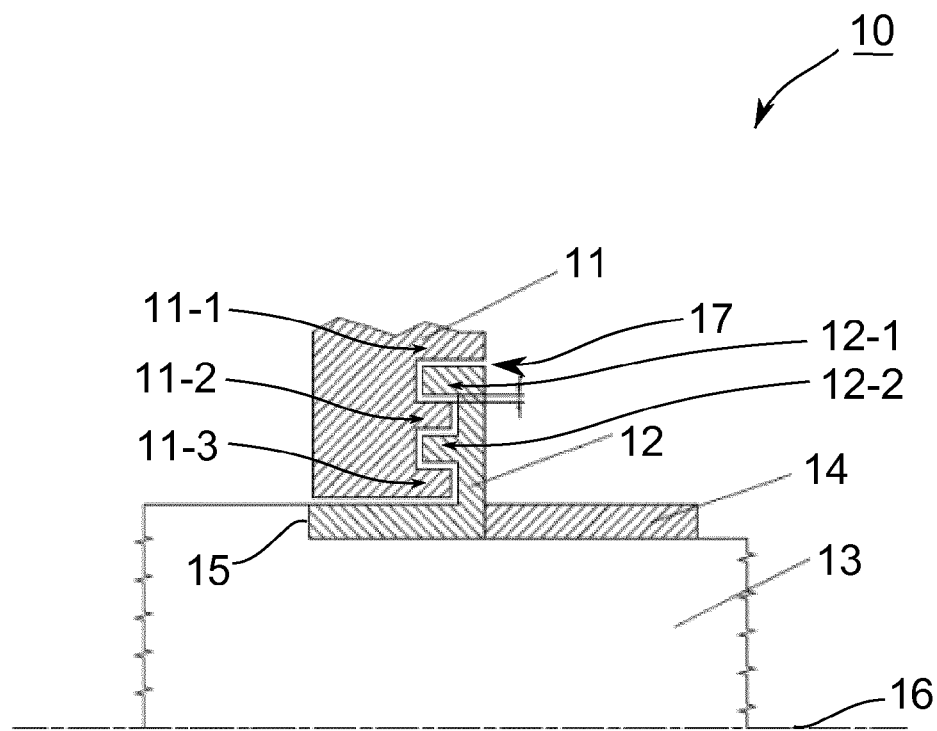
FIGS. 1a, b show in a sectional view an exemplary embodiment of an inventive labyrinth seal assembly having differently-wearing labyrinth rings.

FIG. 1a shows a schematic sectional view of a labyrinth seal assembly 10 according to an exemplary embodiment of the present invention.

The labyrinth seal 10 includes a first labyrinth ring 11 and a second labyrinth ring 12. In the depicted exemplary embodiment, the second labyrinth ring 12 is located on the shaft 13 in a manner that prevents relative rotation therebetween. The connection between the second labyrinth ring 12 and the shaft 13, which connection prevents relative rotation therebetween, can be achieved, for example, by shrinkingfitting or by using an attachment sleeve 14 which, in combination with a shaft shoulder 15, fixes the labyrinth ring 12 on the shaft 13 in a manner that prevents relative rotation therebetween. Here an "axial direction" means a direction of a rotational axis 16 of the shaft 13 and/or the labyrinth seal 10. For the purposes of clarity, only a part of both the shaft 13 and of the labyrinth seal 10 above the shaft axis of rotation 16 is illustrated in FIG. 1a.

FIG. 1a shows the labyrinth seal 10 in an installed state wherein the first labyrinth ring 11 and the second labyrinth ring 12 engage in each other in an at least partially overlapping manner and are rotatable relative to each other about the shaft rotational axis 16. The exemplary embodiment of the labyrinth seal 10 shown in FIG. 1a concerns an axial seal assembly, wherein annularly-arranged ribs 11-1, 11-2, and 11-3 of the first labyrinth ring 11 engage with annularly-arranged ribs 12-1 and 12-2 of the second labyrinth ring 12 in each other and in an overlapping manner. Here it is to be noted that exemplary embodiments of the present invention are by no means only applicable to the axial seal assemblies shown here, but can also be applied by the person skilled in the art to radial labyrinth seal assemblies in a self-evident manner, wherein the annularly-extending ribs of the two labyrinth rings engage in each other in the radial direction in an overlapping manner and are rotatable relative to one another. In this case one would obtain an exemplary radial labyrinth seal assembly by rotating the assembly shown in FIG. 1a by 90° so that the shaft rotational axis 16 is vertical. Similarly, combinations of axial and radial labyrinth seal assemblies are also conceivable which can take advantage of the principle of the present invention.

Due to the labyrinth rings 11 and 12 engaging in each other or their annularly-extending ribs 11-1, 11-2, 11-3 and 12-1, 12-2 engaging in each other, a tortuous and/or convoluted gap 17 forms which is generally also referred to as a seal labyrinth. FIG. 1a shows the sealing gap 17 in an idle position of the labyrinth seal 10, i.e. in an unloaded state, wherein neither axial nor radial forces act on the first and/or second labyrinth ring 11, 12.

As is illustrated by the different hatching directions in FIG. 1a, in the installed state of the labyrinth seal 10, mutually-opposing surfaces of the first and of the second labyrinth ring 11, 12 are manufactured from (different) materials having different wear resistances. Here the mutually-opposing surfaces of the first and second labyrinth ring 11, 12 can also be understood as the surfaces of the first and of the second labyrinth ring 11, 12, which surfaces delimit the sealing gap 17. According to exemplary embodiments of the present invention, at least partial regions of these surfaces delimiting the sealing gap 17 have different wear resistances.

Figure 1B:
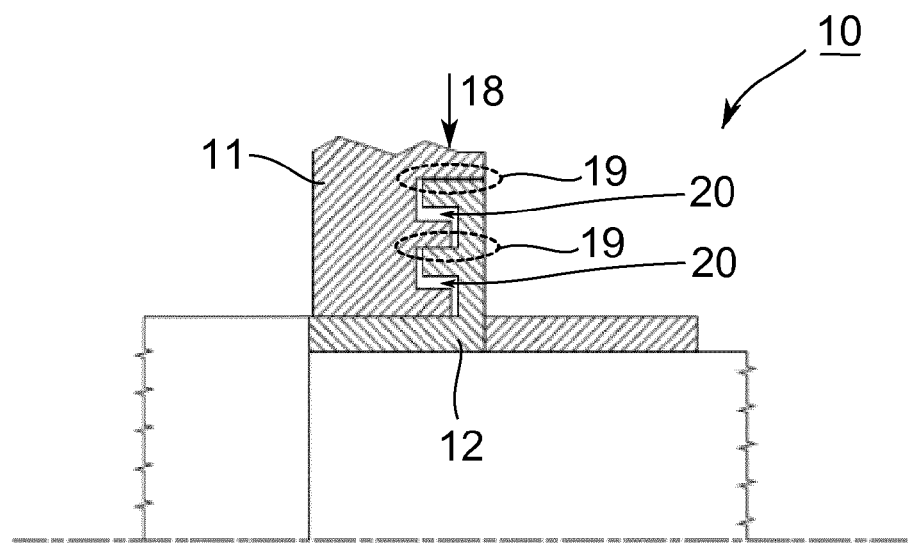

According to the exemplary embodiment shown in FIG. 1a, the first labyrinth ring 11 is, in fact, manufactured completely from a first material. The second labyrinth ring 12 is also manufactured completely from a second material having a lesser wear resistance than the first material. While the first material, for example, can be a (hardened) steel, the second material of the second labyrinth ring 12 can, for example, be a softer material, such as, e.g., a non-ferrous metal or a plastic. FIGS. 1a and 1b thus show a possible exemplary embodiment having an outer labyrinth ring 11 made from steel as well as an inner labyrinth ring 12 made from an appropriate wear-material from the group of non-ferrous metals and/or plastics.

The two labyrinth rings 11, 12 and thus also the mutually-opposing surfaces of the first and of the second labyrinth ring 11, 12 can thus have different material hardnesses. If it behaves as in the exemplary embodiment outlined in FIG. 1a, wherein the material of the first labyrinth ring 11 has a greater material hardness than the material of the second labyrinth ring 12, during operation of the labyrinth seal 10, i.e. during a continuous rotation of the two labyrinth rings 11, 12 relative to each other, upon a contact or upon a coming-together of the two labyrinth rings 11, 12, the material of the second labyrinth ring 12 can wear faster than the material of the first labyrinth ring. In this way, as compared to conventional labyrinth seals, the labyrinth seal 10 is less sensitive with respect to manufacturing tolerances of the two labyrinth rings 11, 12, since contacts of the two labyrinth seal components 11, 12 attributable to manufacturing tolerances do not lead to irreversible damage. An intentional and non-critical material ablation can thus be achieved during unwanted contacts between the two labyrinth rings 11, 12.

For this purpose, FIG. 1b shows the labyrinth seal 10 in a loaded state, wherein a radial force 18 on the outer labyrinth ring 11 effects a change of the gap dimension of the sealing gap 17. While the gap dimension of one half of the axial gap of the sealing labyrinth is significantly reduced by the load (see reference number 19), the gap dimension of the other half of the axially-extending gap is correspondingly enlarged by the radial load (see reference number 20). Manufacturing tolerances of the labyrinth seal 10, i.e. installation errors, thermal expansions, out-of-roundnesses, deformations, etc. act disadvantageously in particular in the reduced axial gap 19, since undesired contacts between the first labyrinth ring 11 and the second labyrinth ring 12 can result from these manufacturing tolerances. Because at least partial regions of the opposing surfaces of the first and of the second labyrinth rings 11, 12 have different wear resistances, when undesired contacts of this type occur, the less-wear-resistant material of a labyrinth ring can be ablated without in this case damaging the labyrinth ring having the more-wear-resistant material (here the outer ring 11).

According to some exemplary embodiments of the present invention, the less-wear-resistant elements, i.e. surface sections of a labyrinth ring or an entire labyrinth ring, can be incorporated in the labyrinth seal 10 such that, after a predetermined amount of wear, they can be replaced or exchanged. The amount of wear can be determined, for example, based upon a tolerable amount of leakage mass flow, that is, e.g., an amount of lubricant escaping from the sealing gap 17. For example, in the exemplary embodiment shown in FIGS. 1a and 1b, the second, less-wear-resistant labyrinth ring 12 is formed so as to be replaceable (e.g. by detaching the sleeve 14). That is, according to some embodiments a complete labyrinth ring having lesser wear resistance can be exchanged after reaching the predefined amount of wear and can be replaced with a new labyrinth ring. As a result, a long-lasting efficiency of the sealing system 10 can be achieved by the return to the optimal gap dimension of the sealing gap 17. Wear and tear caused by contacts or abrasive media inside the sealing gap 17 can be set back to the original state or reversed by the material replacement. In order to facilitate the replacement of the second labyrinth ring 12, according to some exemplary embodiments the ribs 11-1, 11-2, 11-3, 12-1, 12-2 of the two labyrinth rings 11, 12, which ribs 11-1, 11-2, 11-3, 12-1, 12-2 engage in each other in the installation direction (here axially), are formed such that, in the installed state of the labyrinth seal 10, they do not radially or tangentially (to the shaft rotational axis) engage behind each other. This means that, for an easier installation or disassembly, the ribs have no radial or tangential projections which would make more difficult a simple pushing-together in each other or pulling-apart out-of-each-other of the two labyrinth rings 11, 12 in the axial direction. Of course this applies in an analogous manner for a radial seal assembly, wherein the annular ribs each extend in the radial direction and have no appreciable axial projection for mutual engagement behind each other.

Figure 2A:
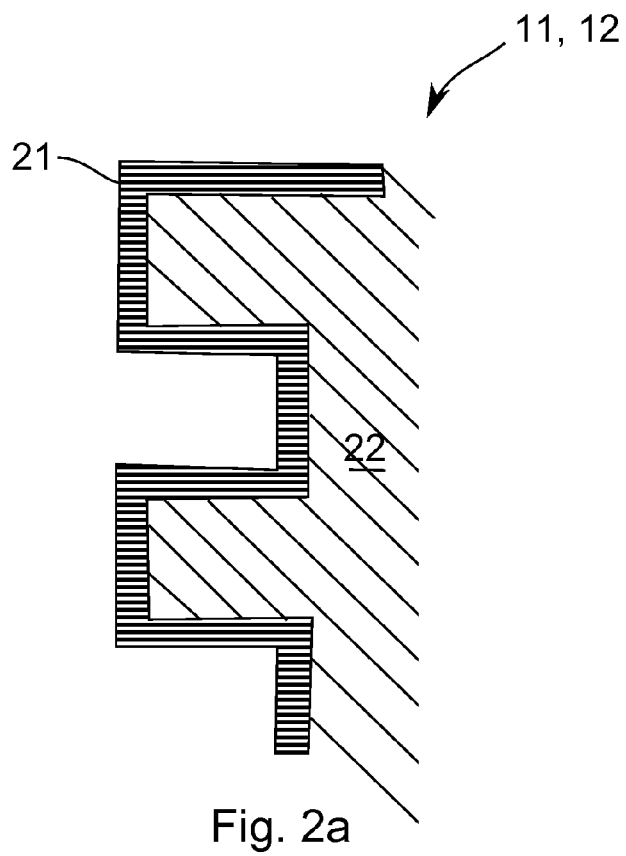
FIGS. 2a, b show different possible embodiments of surface coatings of a labyrinth ring.

FIG. 2a schematically shows an enlarged illustration of an exemplary embodiment, wherein at least one of the two labyrinth rings 11, 12 is manufactured from a surface material 21 and a further material 22 having different wear resistances. Here the surface regions of the ribs 11-1, 11-2, 11-3 or 12-1, 12-2 facing the respective other labyrinth ring are manufactured from the surface material 21. For example, in an assembly according to FIG. 1 the inner labyrinth ring 12 could have the surface material 21 on its surfaces that delimit the sealing gap 17. Depending on the requirements, the surface material 21 can be softer or harder than the further material 22. With a softer surface material 21 this wears faster during operation of the labyrinth seal 10 than the further material 22, from which in some exemplary embodiments the opposing labyrinth ring can also be manufactured. For example, in an assembly according to FIG. 1, the outer ring 11 can be completely comprised of the further material (e.g. steel).

The surface material 21 can be softer (optionally also harder) coatings than the further or remaining material 22. However, a lesser (optionally also greater) wear resistance can also be achieved by other appropriate surface treatments, which lead to a softening (optionally also hardening) of the surface material 21. Thus the surface material 21 can also be softened or hardened by peening or alloy addition of other material components. Overall, therefore, in the context of the present invention, "different materials" are also understood to mean differently-treated materials (e.g. hardened steel compared to unhardened steel) and/or different material alloys.

Figure 2B:
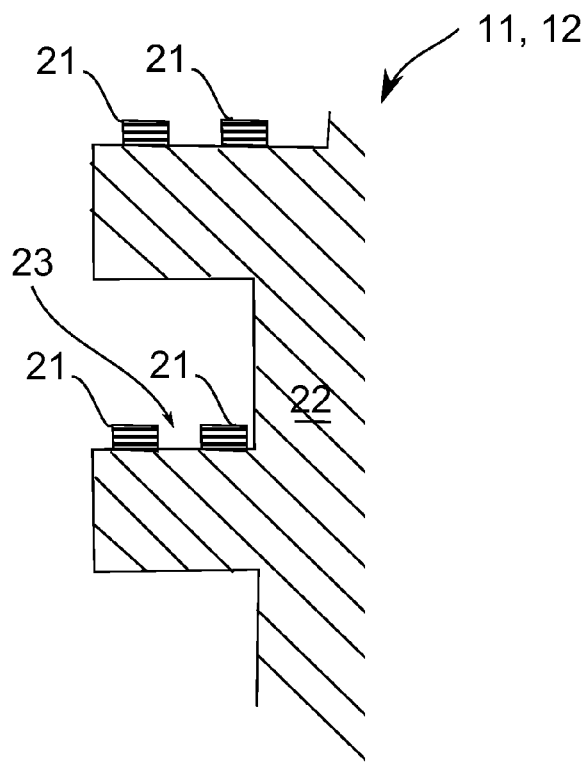

As is shown in FIG. 2b, the surface material 21 need not necessarily be applied continuously to a surface region facing the other labyrinth ring or delimiting the sealing gap 17. Exemplary embodiments are also conceivable wherein a less-wear-resistant or softer surface material 21 is applied only sectionally to a surface of a labyrinth ring 11 or 12, which surface delimits the sealing gap 17. The surface regions having the surface material 21 are thus spaced from one another (see reference number 23). This can for example be advantageous if unwanted contacts between the two labyrinth rings 11, 12 can only result in these few specific (coated or treated) surface regions. Due to the only partial application of the surface material 21, material costs, among other things, for surface materials which are expensive in certain circumstances and/or surface treatments can be reduced.

Thus embodiments are also conceivable wherein entire labyrinth rings 11 or 12 do not need to be replaced after wear of a less-wear-resistant material, but rather only the affected regions 21 themselves. For example, for this purpose a plastic layer applied to a labyrinth ring could be exchanged and replaced with a new, unworn plastic layer.

Although some aspects of the present invention have been described in the context of a device, it is to be understood that these aspects also represent a description of a corresponding method, so that a block or a component of a device is also understood as a corresponding method step or as a feature of a method step. In an analogous manner, aspects which have been described in the context of or as a method step also represent a description of a corresponding block or detail or feature of a corresponding device.

The above-described exemplary embodiments represent only an illustration of the principles of the present invention. It is understood that modifications and variations of the arrangements and details described herein will be clear to other persons of skill in the art. It is therefore intended that the invention be limited only by the scope of the following patent claims, and not by the specific details which have been presented with reference to the description and the explanation of the exemplary embodiments.

REFERENCE NUMBER LIST

10 Labyrinth seal according to an exemplary embodiment of the present invention
11 First labyrinth ring
13 Second labyrinth ring
13 Shaft
14 Attachment sleeve
15 Shaft shoulder
16 Seal- and shaft-axis-of-rotation
17 Convoluted gap
18 Radial force
19 Narrow gap dimension
20 Wide gap dimension
21 Surface material of a labyrinth ring
22 Further/remaining material of labyrinth ring
23 Spacing between sectionally applied surface material

The invention claimed is:

1. A labyrinth seal comprising:
a first labyrinth ring and
a second labyrinth ring engaged with the first labyrinth ring in an at least partially overlapping manner, the first labyrinth ring being rotatable relative to the second labyrinth ring or the second labyrinth ring being rotatable relative to the first labyrinth ring,
wherein at least one first surface of the first labyrinth ring opposes at least one second surface of the second labyrinth ring,
the at least one first surface is comprised of at least one replaceable surface material disposed on a base material, and
the at least one replaceable surface material has a lower wear resistance than the base material and the at least one second surface, wherein the at least one replaceable surface material is configured to wear faster than the at least one second surface when the at least one replaceable surface material and the at least one second surface contact during operation.

2. The labyrinth seal according to claim 1, wherein the at least one replaceable surface material has a different material hardness than the base material and the at least one second surface.

3. The labyrinth seal according to claim 2, wherein the at least one replaceable surface material has a lesser material hardness than the at least one second surface.

4. The labyrinth seal according to claim 3, wherein the at least one second surface is comprised of steel, and the at least one replaceable surface material is selected from the group consisting of non-ferrous metals and plastics.

5. The labyrinth seal according to claim 4, wherein the at least one replaceable surface material is a plastic layer detachably applied to the base material.

6. The labyrinth seal according to claim 5, wherein the first and second labyrinth rings each comprise a plurality of linearly-extending ribs that extend parallel to each other without an interference fit.

7. The labyrinth seal according to claim 6, wherein the second labyrinth ring is manufactured completely from steel.

8. The labyrinth seal according to claim 7, wherein the at least one replaceable surface material is softer than the base material so that, during operation of the labyrinth seal, the at least one replaceable surface material wears faster than the base material.

9. A method for operating the labyrinth seal of claim 8, comprising:
   determining when the plastic layer has experienced a predetermined amount of wear based upon attainment of a tolerable amount of leakage mass flow out of the labyrinth seal,
   disengaging the first labyrinth ring from the second labyrinth ring,
   detaching the plastic layer from the base material,
   applying a new plastic layer to the base material, and
   re-engaging the first labyrinth ring with the second labyrinth ring.

10. The labyrinth seal according to claim 1, wherein the at least one replaceable surface material is a plastic layer detachably applied to the base material.

11. The labyrinth seal according to claim 1, wherein the base material is steel and the at least one second surface is steel.

12. The labyrinth seal according to claim 1, wherein the first and second labyrinth rings each comprise a plurality of linearly-extending ribs that extend parallel to each other without an interference fit.

13. The labyrinth seal according to claim 12, wherein the engaged ribs of the first and second labyrinth rings define a tortuous sealing gap between the first and second labyrinth rings.

14. The labyrinth seal according to claim 1, wherein the second labyrinth ring is manufactured completely from steel.

15. The labyrinth seal according to claim 1, wherein the at least one replaceable surface material is softer than the base material so that, during operation of the labyrinth seal, the at least one replaceable surface material wears faster than the base material.

16. A method for operating the labyrinth seal of claim 1, comprising:
   determining when the at least one replaceable surface material has experienced a predetermined amount of wear based upon attainment of a tolerable amount of leakage mass flow out of the labyrinth seal,
   disengaging the first labyrinth ring from the second labyrinth ring,
   replacing the worn at least one replaceable surface material with a new at least one replaceable surface material, and
   re-engaging the first labyrinth ring with the second labyrinth ring.

17. The labyrinth seal according to claim 1, wherein the first labyrinth ring comprises an inner surface that directly contacts a shaft in a manner that prevents relative motion therebetween.

18. The labyrinth seal according to claim 17, further comprising an attachment sleeve that is configured to directly contact a first axial end of the first labyrinth ring;
   wherein the shaft further comprises a shaft shoulder configured to directly contact a second axial end of the first labyrinth ring such that the shaft shoulder and the attachment sleeve detachably fix the first labyrinth ring to the shaft in a manner that prevents relative motion therebetween.

19. The labyrinth seal according to claim 18, wherein the first labyrinth ring and the second labyrinth ring are configured such that the first labyrinth ring can be detached from the shaft and disengaged from the second labyrinth ring without moving the second labyrinth ring with respect to the shaft and without the first and second labyrinth rings contacting.

20. A method for operating a labyrinth seal comprising:
   providing a first labyrinth ring and a second labyrinth ring so that, in the installed state of the labyrinth seal, surfaces of the first and of the second labyrinth ring having different wear resistances oppose each other such that one of the first and second labyrinth rings is configured to wear faster than the other when the first and second labyrinth rings contact each other during operation; and
   installing the labyrinth seal so that, in the installed state of the labyrinth seal, the first and the second labyrinth rings engage in each other in an at least partially overlapping manner and are rotatable relative to each other.

* * * * *